(12) United States Patent
Hua

(10) Patent No.: US 7,427,219 B1
(45) Date of Patent: Sep. 23, 2008

(54) TERMINAL CONNECTOR WITH EASY ENTRY AND MANUFACTURING METHOD THEREOF

(75) Inventor: Chang Chun Hua, Chang Hwa (TW)

(73) Assignee: K.S. Terminals, Inc., Chang Hwa (TW)

( * ) Notice: Subject to any disclaimer, the term of this patent is extended or adjusted under 35 U.S.C. 154(b) by 0 days.

(21) Appl. No.: 12/003,212

(22) Filed: Dec. 20, 2007

(30) Foreign Application Priority Data

Oct. 11, 2007 (CN) .................................. 96137947

(51) Int. Cl.
*H01R 4/02* (2006.01)

(52) U.S. Cl. ...................................... 439/874; 174/84 R

(58) Field of Classification Search ................. 439/874, 439/932, 730; 174/84 R, 84 C
See application file for complete search history.

(56) References Cited

U.S. PATENT DOCUMENTS

| | | | |
|---|---|---|---|
| 3,297,894 A * | 1/1967 | Hall et al. ................. | 313/361.1 |
| 3,305,625 A | 2/1967 | Ellis | |
| 3,316,343 A | 4/1967 | Sherlock | |
| 3,396,460 A | 8/1968 | Wetmore | |
| 3,525,799 A | 8/1970 | Ellis | |
| 3,541,495 A | 11/1970 | Ellis et al. | |
| 3,582,457 A | 6/1971 | Barthell | |
| 3,601,783 A | 8/1971 | Loose | |
| 3,957,382 A | 5/1976 | Greuel, Jr. et al. | |
| 4,144,404 A | 3/1979 | De Groef et al. | |
| 4,151,364 A | 4/1979 | Ellis | |
| 4,176,244 A | 11/1979 | Ramy et al. | |
| 4,206,786 A | 6/1980 | Wetmore | |
| 4,341,921 A * | 7/1982 | Simpson ................... | 174/84 R |
| 4,346,145 A | 8/1982 | Choi et al. | |
| 4,504,699 A | 3/1985 | Dones et al. | |
| 4,576,871 A | 3/1986 | Oestreich | |
| 4,586,971 A | 5/1986 | Wallace, Jr. | |
| 4,595,724 A | 6/1986 | Koblitz | |
| 4,696,841 A | 9/1987 | Vidakovits | |
| 4,781,606 A | 11/1988 | Clabburn | |
| 4,790,067 A | 12/1988 | Grindle | |
| 4,849,580 A | 7/1989 | Reuter | |
| 4,863,535 A | 9/1989 | More | |
| 4,881,995 A | 11/1989 | Arenz | |
| 4,883,925 A | 11/1989 | Graf | |
| 4,894,030 A | 1/1990 | Chavaroux | |

(Continued)

*Primary Examiner*—Phuong K Dinh
(74) *Attorney, Agent, or Firm*—Reed Smith LLP; Stanley P. Fisher, Esq.; Juan Carlos A. Marquez, Esq.

(57) ABSTRACT

A terminal connector with easy entry and manufacturing method thereof are disclosed. The terminal connector includes an insulating tube, a conductive terminal, and a soldering sleeve. The insulating tube shrinks to deform when being heated to a first temperature. The conductive terminal has a first end accommodated in the insulating tube and comprises an elongation bended to form a longitudinal opening. The soldering sleeve with a melting point at a third temperature is arranged in the elongation of the conductive terminal, while the end of the soldering sleeve extends out the elongation has a gradually enlarged portion. When the insulating tube is appropriately heated at where corresponds to the soldering sleeve by the temperature between the first temperature and the third temperature, an interior of the insulating tube shrinks to lodge the gradually enlarged portion of the soldering sleeve to form the conductive terminal with easy entry for allowing a conducting core to insert.

14 Claims, 10 Drawing Sheets

U.S. PATENT DOCUMENTS

| | | |
|---|---|---|
| 4,910,090 A | 3/1990 | Kuhlman et al. |
| 4,940,179 A | 7/1990 | Soni |
| 4,993,149 A | 2/1991 | Zilligen et al. |
| 5,137,478 A | 8/1992 | Graf et al. |
| 5,150,931 A | 9/1992 | Hagio et al. |
| 5,174,616 A | 12/1992 | Hagio et al. |
| 5,221,815 A | 6/1993 | Bostock et al. |
| 5,278,354 A | 1/1994 | Lhomme |
| 5,288,245 A | 2/1994 | Piana et al. |
| 5,340,230 A | 8/1994 | Anderson |
| 5,369,225 A | 11/1994 | Natwig et al. |
| 5,371,322 A | 12/1994 | Selmeski |
| 5,393,932 A | 2/1995 | Young et al. |
| 5,406,031 A | 4/1995 | Mathieu et al. |
| 5,418,331 A | 5/1995 | Delalle |
| 5,466,176 A | 11/1995 | Cornell et al. |
| 5,509,202 A | 4/1996 | Abdow |
| 5,514,836 A | 5/1996 | Delalle et al. |
| 5,527,612 A | 6/1996 | Ohta et al. |
| 5,551,138 A | 9/1996 | Grajewski et al. |
| 5,574,258 A | 11/1996 | Blonder |
| 5,599,297 A | 2/1997 | Chin et al. |
| 5,644,189 A | 7/1997 | Busby |
| 5,859,385 A | 1/1999 | Nicolai |
| 5,922,992 A | 7/1999 | Kinney et al. |
| 6,048,224 A | 4/2000 | Kay |
| 6,315,527 B1 | 11/2001 | Makino et al. |
| 6,338,644 B1 | 1/2002 | Fritzinger et al. |
| 6,653,925 B1 | 11/2003 | Asami et al. |
| 6,666,732 B1 | 12/2003 | Endacott |
| 6,677,529 B1 | 1/2004 | Endacott |
| 6,838,621 B2 | 1/2005 | Endacott |
| 6,906,268 B2 | 6/2005 | Fartash et al. |
| 7,007,381 B2 | 3/2006 | Peters et al. |
| 7,048,562 B2 | 5/2006 | Lutsch et al. |
| 7,066,774 B2 | 6/2006 | Fargo et al. |
| 7,131,193 B2 | 11/2006 | Fartash et al. |
| 7,175,481 B1 | 2/2007 | Cotton et al. |

\* cited by examiner

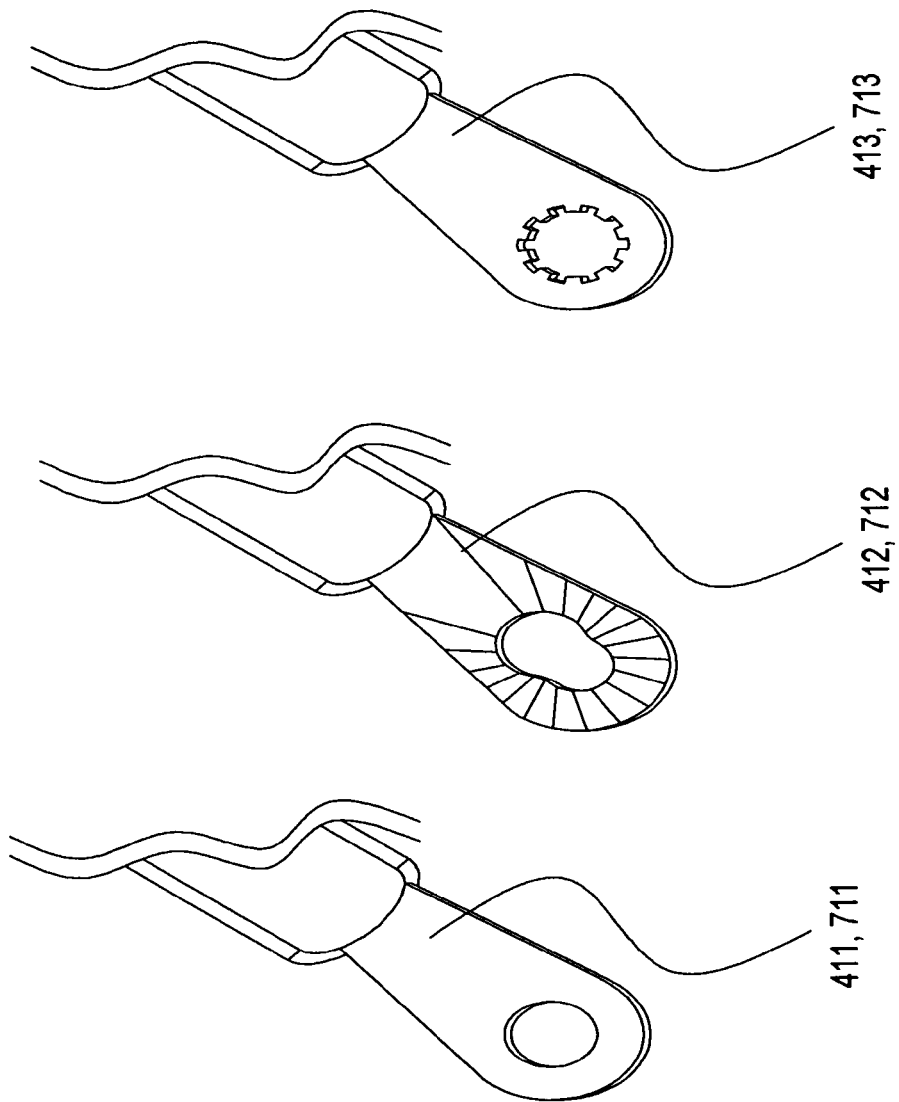

422, 722

421, 721

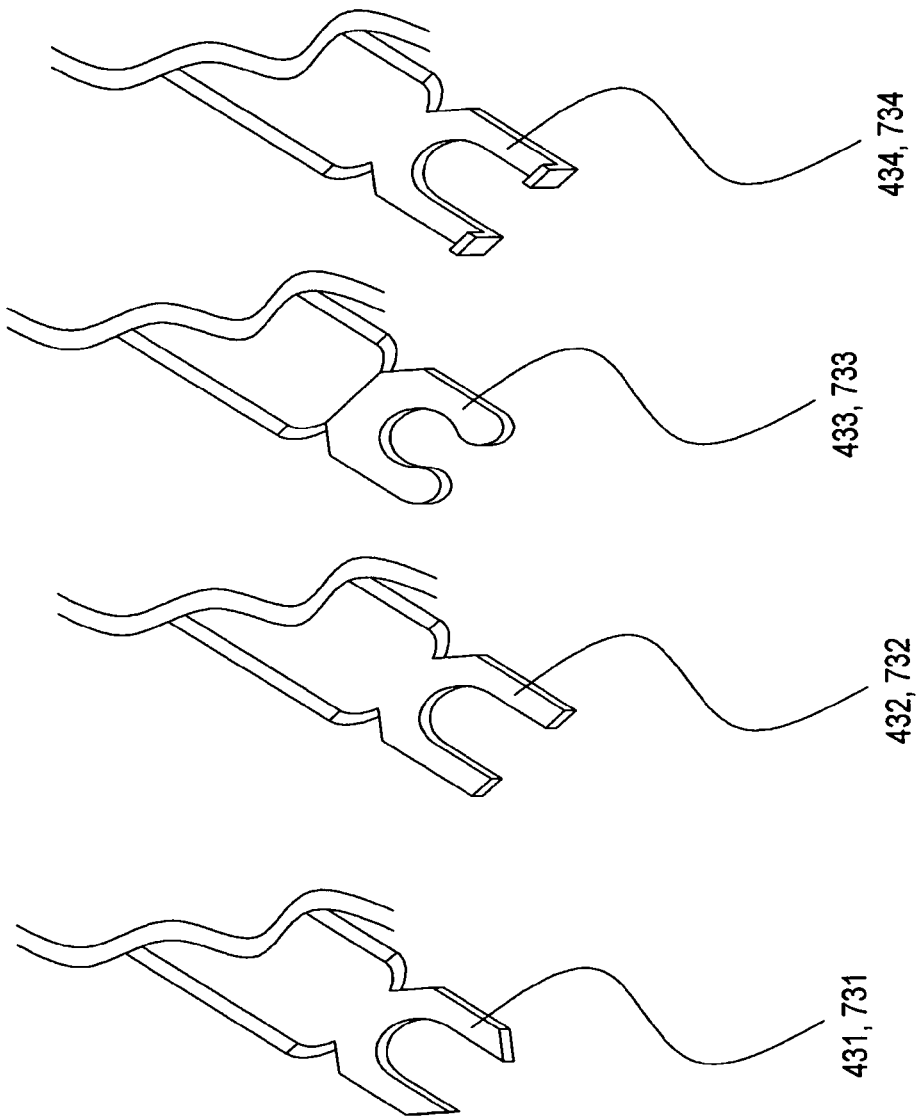

TERMINAL CONNECTOR WITH EASY ENTRY AND MANUFACTURING METHOD THEREOF

BACKGROUND OF THE INVENTION

1. Field of the Invention

The present invention relates to a terminal connector with easy entry and a manufacturing method thereof, and more particularly, to a terminal connector with easy entry that employs an insulating tube and a soldering sleeve as an interconnecting device for interconnecting a conducting terminal and a conducting wire.

2. Description of Related Art

In interconnecting conducting wires, an insulating adhesive tape is conventionally used to wind around conducting cores of the conducting wires that are exposed to an outside of insulating claddings of the conducting wires causing the conducting cores to connect with each other, thereby achieving electrical conduction therebetween. However, due to the use of the adhesive tape, the conducting wires may be easily affected by the environment to cause problems such as electric leakage or being affected with damp. In response to these problems, U.S. Pat. No. 4,883,925 proposed a conducting wire connecting device 1. Referring to FIG. 1A, the connecting device 1 includes an insulating tube 11 with an adhesive coating 111 on an inner surface thereof. A solder sleeve 112 with smooth outer and inner surfaces is disposed in the insulating tube 11. The outer surface of the solder sleeve 112 is connected to the inner surface of the insulating tube 11 by the adhesive coating 111. An external heater is then used to melt the solder sleeve 112 to thereby join the conducting cores of the two conducting wires. The insulating tube 11 is then heated to shrink to secure the conducting wires, thereby achieving the conducting wire connection and electrical conduction. However, forming the adhesive coating 111 on the inner surface of the insulating tube 11 of the connecting device 1 leads to a high cost, and it can be difficult to dispose the solder sleeve 112 into the insulating tube 11 after the forming of the adhesive coating 111.

Referring to FIG. 1B, U.S. Pat. No. 5,137,478 proposed a conducting terminal connector with solder material. The conducting terminal includes a semicircular end portion 12. A solder material 121 is coated on an inside of the semicircular end portion 12, for connecting with a conducting core.

Referring to FIG. 1C, U.S. Pat. No. 6,666,732 proposed another conducting terminal connector with solder material. The conducting terminal includes a round tubular end portion 13. The round tubular end portion 13 includes a solder sleeve 131 for connecting with a conducting core.

However, there are still imperfections in the above-mentioned prior art technologies and improvements thereof are therefore desired.

SUMMARY OF THE INVENTION

In attempt to solve the problems described above, the present invention provides a terminal connector and a method for manufacturing the same. The terminal connector with easy entry generally includes an insulating tube, a conducting terminal, and a soldering sleeve, for interconnecting the conducting terminal and a conducing wire. The insulating tube shrinks to deform when being heated to a temperature higher than a first temperature and has a melting point at a second temperature. A first end of the conducting terminal may be bent to form a longitudinal elongation with an opening facing upward. The soldering sleeve may be arranged on the longitudinal elongation of the conducting terminal and may have a melting point at a third temperature that is between the first temperature and the second temperature. The soldering sleeve may include an outer surface that is corrugated. One end of the soldering sleeve may extend out of the longitudinal elongation of the conducting terminal, and the extend-out section of soldering sleeve may include a radially gradually enlarged portion. When a heat source is appropriately applied to an outer periphery of the insulating tube that corresponds to the soldering sleeve to heat the insulating tube to a temperature above the first temperature but below the third temperature, causing the heated insulating tube to shrink to lodge into gaps in the corrugated outer surface and affix to an end surface outside an end point of the radially enlarged portion, an inner periphery of the insulating tube may form a gradually converging configuration oriented toward the end point of the radially enlarged portion of the soldering sleeve, thereby achieving the terminal connector with easy entry such that the insulating tube and the soldering sleeve may be tightly connected and the conducting core may be allowed to be readily inserted.

Accordingly, in one aspect, embodiments of the present invention provide a terminal connector with easy entry that can facilitate insertion of the conducting core of the conducting wire.

In another aspect, embodiments of the present invention provide a method for manufacturing a terminal connector with easy entry wherein the terminal connector so manufactured can facilitate insertion of the conducting core of the conducting wire.

In another aspect, embodiments of the present invention provide a terminal connector with easy entry that can be manufactured with a simplified method and can facilitate insertion of the conducting core of the conducting wire.

In yet another aspect, embodiments of the present invention provide a simplified method for manufacturing a terminal connector with easy entry wherein the terminal connector so manufactured can facilitate insertion of the conducting core of the conducting wire.

BRIEF DESCRIPTION OF THE DRAWINGS

FIGS. 4A through 4L illustrate conducting terminals in accordance with a first to a third preferred embodiment of the present invention.

DETAILED DESCRIPTION OF THE PREFERRED EMBODIMENTS

The present invention discloses a terminal connector and a method for fabricating the same. The principle in the connector fabrication and electrical conduction has been disclosed in detail in the related art section, and therefore, the manner that the conducting wire is connected to the conducting core will not be described in detail in the following description. Also, the drawings referred to in the following description are not made according to actual dimensions and are merely schematic views showing features of the present invention.

Figure 1A:
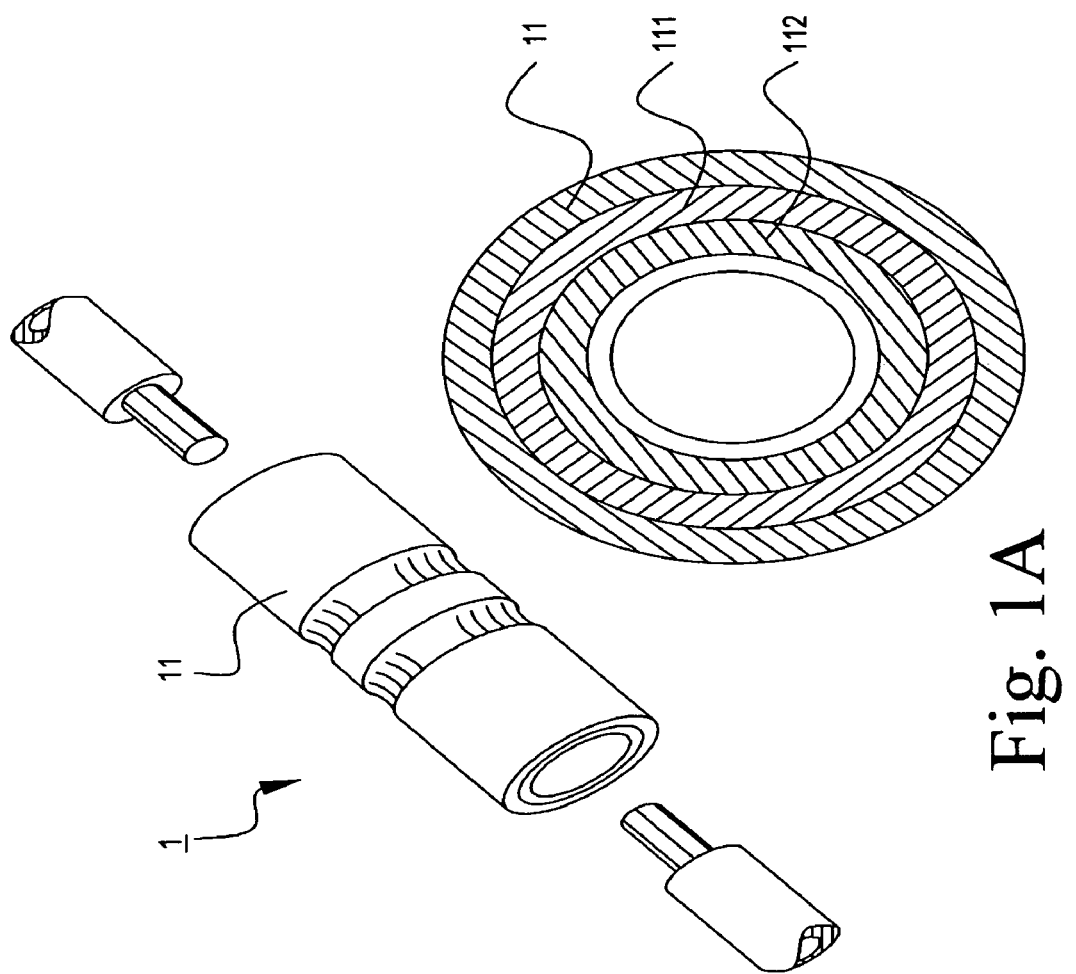
FIGS. 1A, 1B, 1C illustrate conventional terminal connectors with easy entry.
Figure 1B:
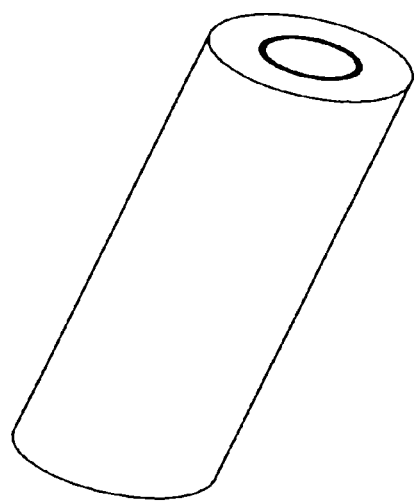
Figure 1B:
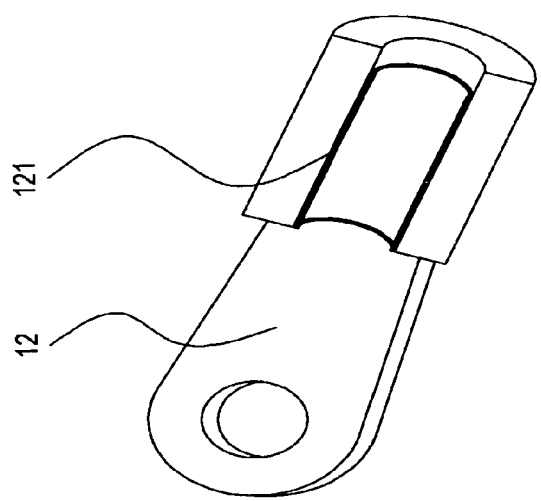
Figure 1C:
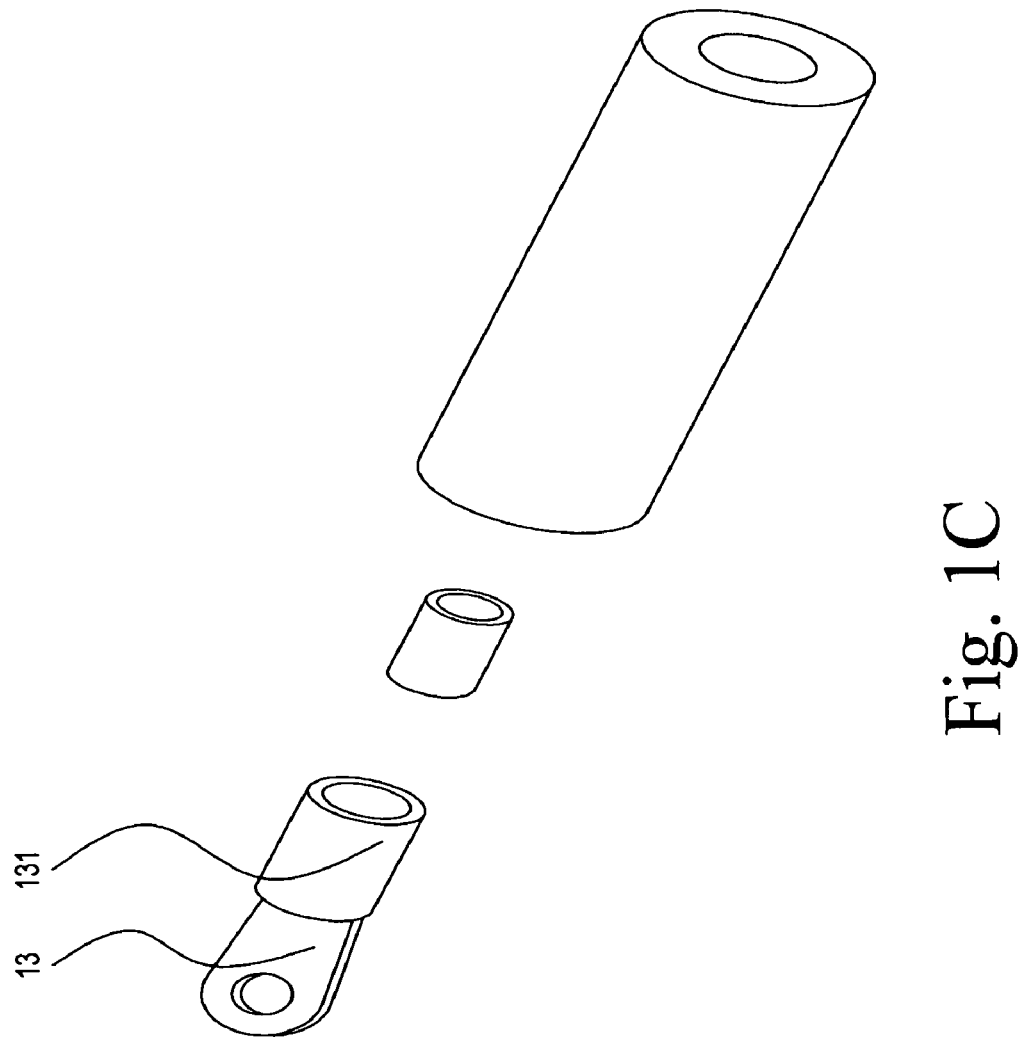
Figure 2:
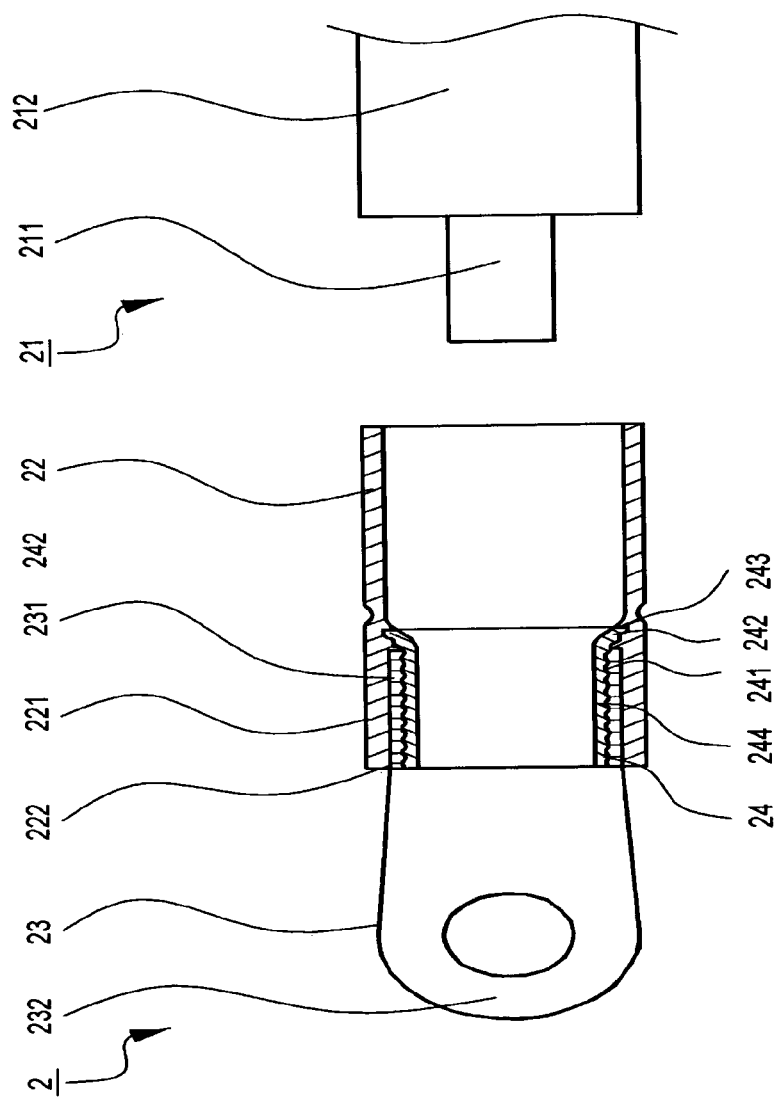
FIG. 2 illustrates a terminal connector with easy entry in accordance with a first preferred embodiment of the present invention.
Figure 3B:
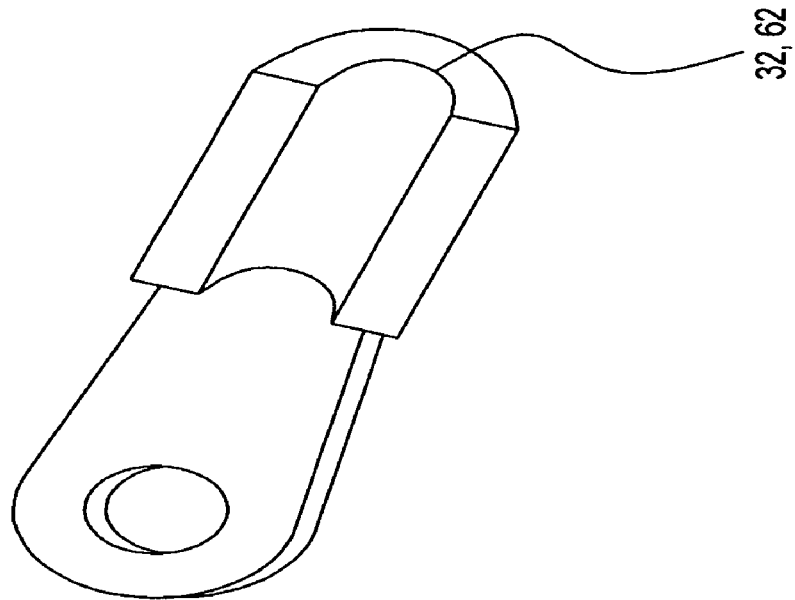
FIG. 3 illustrates a conducting terminal in accordance with a first preferred embodiment of the present invention.
Figure 3A:
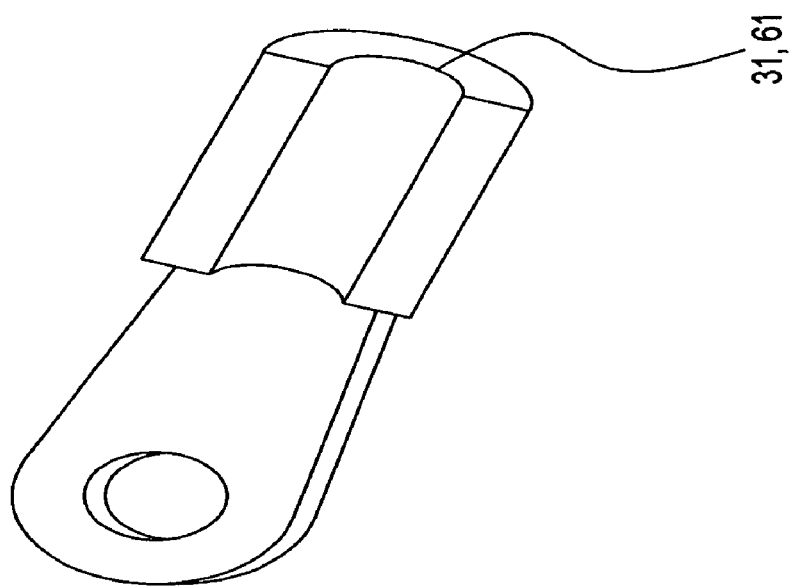

FIG. 2 is a schematic view of a terminal connector with easy entry in accordance with a first preferred embodiment of the present invention. The terminal connector with easy entry 2 is used to interconnect a conducting terminal 23 and at least one conducting wire 21. Each said conducting wire 21 includes a conducting core 211 and an insulating cladding 212 enclosing the conducting core 211. The terminal conductor with easy entry 2 includes an insulating tube 22, a conducting terminal 23, and a soldering sleeve 24. The insulating tube 22 shrinks to deform due to its own material characteristic when being heated to a temperature higher than a first temperature and has a melting point at a second temperature.

Figure 4E:
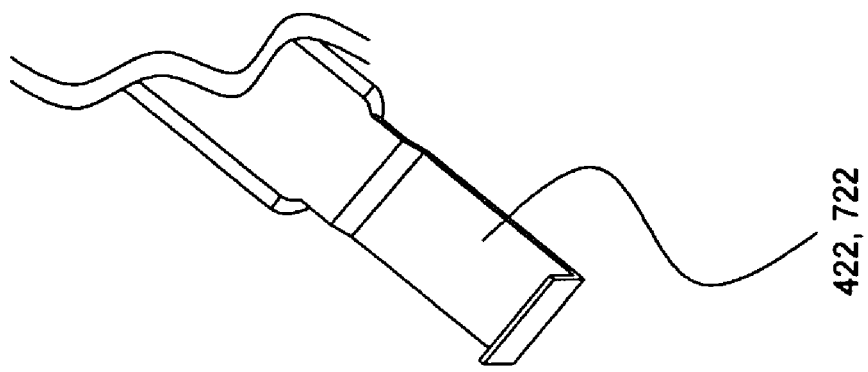
Figure 4D:
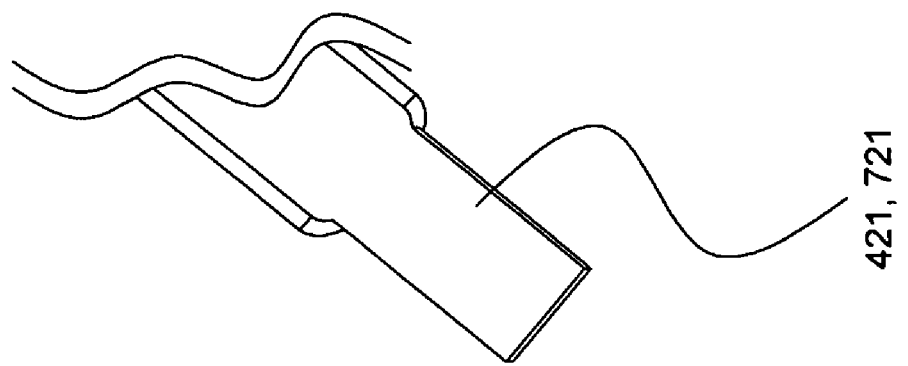
Figure 4L:
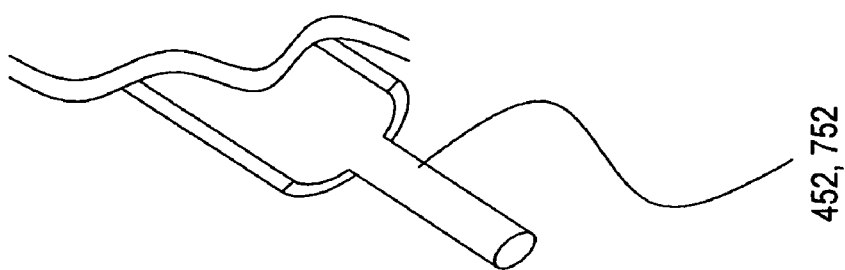
Figure 4K:
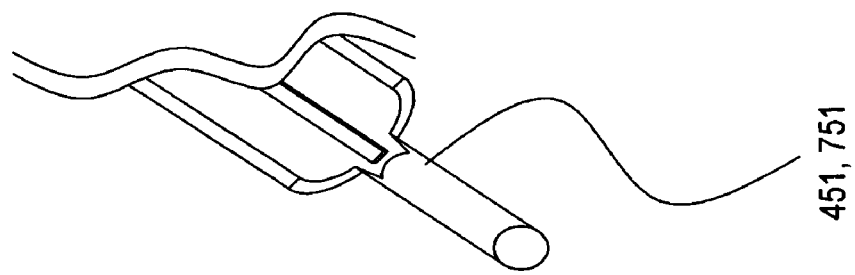
Figure 4J:
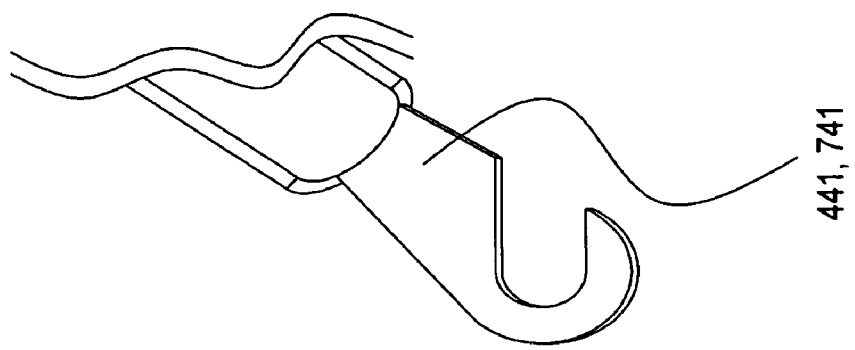

FIGS. 3 and 4A-4E illustrate a conducting terminal. A material for making the conducting terminal 23 may be selected from the group consisting of brass, bronze, copper alloy, stainless steel, gold, gold alloy and platinum. The conducting terminal 23 includes a first end 231 accommodated in the insulating tube 22, and a second end 232 opposite to the first end 231. The second end 232 of the conducting terminal 23 is exposed to an outside, for connecting to an external conducting contact point. The first end 231 of the conducting terminal 23 is less in length than the insulating tube 22. The first end 231 of the conducting terminal 23 is bent to form a longitudinal elongation with an opening facing upward. The longitudinal elongation may be either a semicircular elongation 31 (seeing FIG. 3) or a C-shaped elongation. Configuration of the second end 232 of the conducting terminal 23 may be one of: a disk-shaped portion with a central opening 411, 412 (Seeing FIGS. 4A, 4B), a disk-shaped portion having a central opening with serrations extending into the central opening 413 (Seeing FIG. 4C), an elongated plate portion 421 (Seeing FIG. 4D), an elongated plate portion with a bent distal end portion 422 (Seeing FIG. 4E), a plate portion with a Y-shaped front edge 431, 432, 433 (Seeing FIGS. 4F, 4, 4H), a Y-shaped portion with at least one distal end bent portion 434 (Seeing FIG. 4I), a hook-shaped portion with an inclined opening 441 (Seeing FIG. 4J), an elongated round pin portion 451 (Seeing FIG. 4K) and an elongated oblate pin portion 452 (Seeing FIG. 4L).

The soldering sleeve 24 is arranged in the longitudinal elongation of the conducting terminal 23. The soldering sleeve 24 may include a slit configuration that is a characteristic formed in a sleeve body thereof during metal forming of the soldering sleeve 24. A material for making the soldering sleeve 24 can be selected from the group consisting of tin, plumbum, nickel, gold, silver, copper, bismuth and alloys of any of the above metals. The soldering sleeve 24 includes an outer surface 241 that is corrugated, and an inner surface 244 that may also be corrugated. One end of the soldering sleeve 24 extends out of the longitudinal elongation of the conducting terminal 23, and the extend-out section of soldering sleeve 24 includes a radially gradually enlarged portion 242 for facilitating the insertion of the conducting core 211 into the soldering sleeve 24. In the illustrated embodiment, the soldering sleeve 24 has a melting point at a third temperature that is between the first temperature and the second temperature. When a heat source is appropriately applied to an outer periphery 221 of the insulating tube 22 that corresponds to the soldering sleeve 24 to heat the insulating tube 22 to a temperature above the first temperature but below the third temperature, causing the heated insulating tube 22 to shrink to lodge into gaps in the corrugated outer surface 241 of the soldering sleeve 24 and affix to an end surface 243 outside an end point of the radially enlarged portion, an inner periphery of the insulating tube 22 forms a gradually converging configuration oriented toward the end point of the radially enlarged portion 242 of the soldering sleeve 24. With this gradually converging configuration, the terminal connector with easy entry 2 is achieved such that the insulating tube 22 and the soldering sleeve 24 are tightly connected and the conducting core 211 is allowed to be readily inserted from the one end of the soldering sleeve 24.

In the above-described embodiment, the corrugated surface of the soldering sleeve 24 may be either a wavy surface or a serrated surface. The waves of the wavy surface may have a same or different height. The gaps between the waves may have a same or different width. In one preferable embodiment, the waves of the wavy surface have a same height and the gaps between the waves have a same width. The serrations of the serrated surface may have a same or different height. The gaps between the serrations may have a same or different width. In one preferable embodiment, the serrations of the serrated surface have a same height and the gaps between the serrations have a same width.

A method for manufacturing a terminal connector with easy entry 2 in accordance with a second preferred embodiment is further provided. The terminal connector with easy entry 2 is suitable for interconnecting a conducting terminal 23 and at least one conducting wire 21. Each said conducting wire 21 includes a conducting core 211 and an insulating cladding 212 enclosing the conducting core 211. The manufacturing method includes:

(1) providing an insulating tube 22, the insulating tube 22 shrinking to deform when being heated to a temperature higher than a first temperature and having a melting point at a second temperature;

(2) providing a conducting terminal 23, the conducting terminal 23 including a first end 231 and a second end 232 opposite to the first end 231, the second end 232 being exposed to an outside for connecting to an external conducting contact point, the first end 231 being bent to form a longitudinal elongation with an opening facing upward;

(3) arranging the longitudinal elongation of the first end 231 of the conducting terminal in the insulating tube;

(4) arranging a soldering sleeve 24 on the longitudinal elongation of the conducing terminal, the soldering sleeve 24 having a melting point at a third temperature that is between the first temperature and the second temperature, the soldering sleeve having an outer surface 241 that is corrugated, one end of the soldering sleeve 24 extending out of the longitudinal elongation of the conducting terminal 23, the extend-out section of the soldering sleeve including a radially gradually enlarged portion 242; and (5) appropriately applying a heat source to an outer periphery 221 of the insulating tube 22 that corresponds to the soldering sleeve 24 to heat the insulating tube 22 to a temperature above the first temperature but below the third temperature, causing the heated insulating tube 22 to shrink to lodge into gaps in the corrugated outer surface 241 of the soldering sleeve 24 and affix to an end surface 243 outside an end point of the radially enlarged portion, such that an inner periphery of the insulating tube 22 forms a gradually converging configuration oriented toward the end point of the radially enlarged portion 242 of the soldering sleeve 24, thereby achieving the terminal connector with easy entry 2 such that the insulating tube 22 and the soldering sleeve 24 are tightly connected and the conducting core 211 is allowed to be readily inserted.

In the illustrated embodiment, the terminal connector 2, insulating tube 22, outer periphery 221 of the insulating tube, conducting terminal 23, first end 231 of the conducting terminal, second end 232 of the conducting terminal, soldering sleeve 24, corrugated outer surface 241 of the soldering sleeve, radially enlarged portion 242 and end surface 243 have the same characteristics as those described in the first embodiment.

Figure 5:
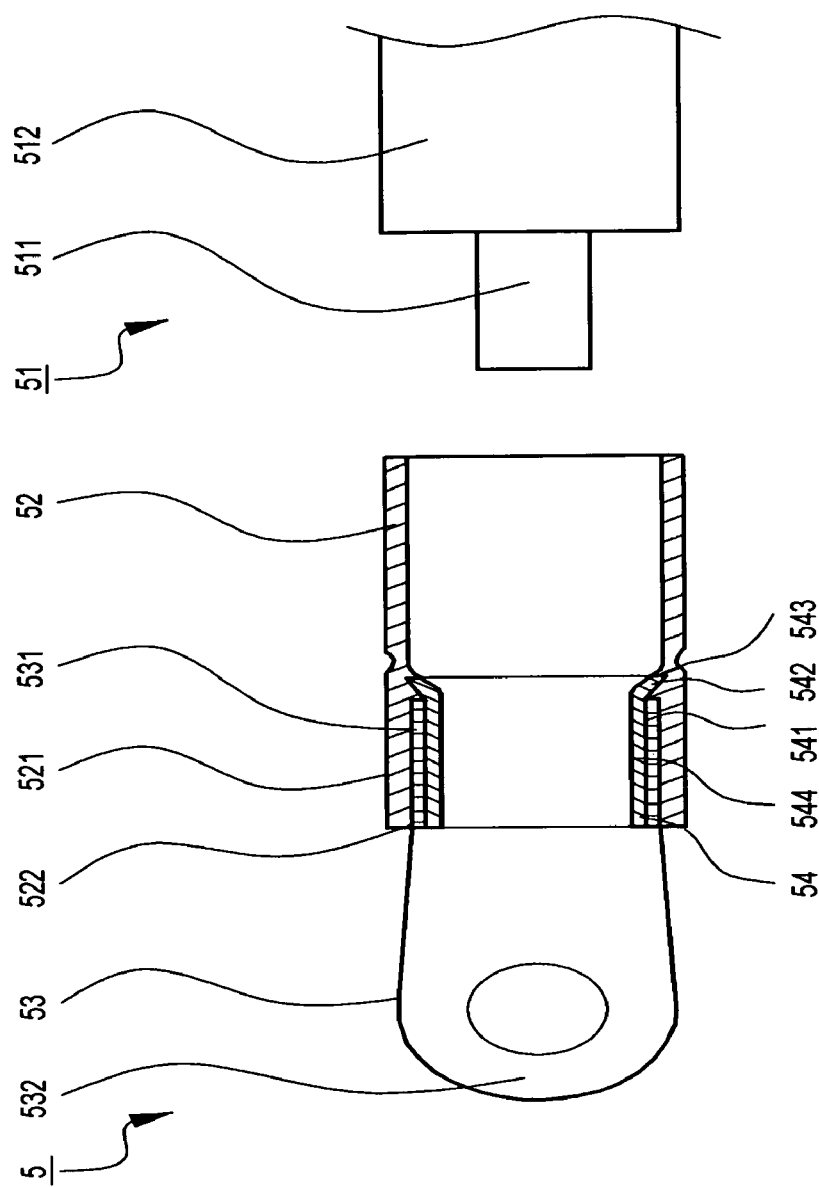
FIG. 5 illustrates a terminal connector with easy entry in accordance with the third preferred embodiment of the present invention.

As shown in FIG. 5, a terminal connector with easy entry in accordance with a third preferred embodiment is further illustrated. The terminal connector with easy entry 5 is used to interconnect a conducting terminal 53 and at least one conducting wire 51. Each said conducting wire 51 includes a conducting core 511 and an insulating cladding 512 enclosing the conducting core 511. The terminal conductor with easy entry 5 includes an insulating tube 52, a conducting terminal 53, and a soldering sleeve 54. The insulating tube 52 shrinks to deform due to its own material characteristic when being heated to a temperature higher than a first temperature and has a melting point at a second temperature.

FIGS. 3 and 4A-4L illustrate various embodiments of the conducting terminal. A material for making the conducting terminal 53 may be selected from the group consisting of brass, bronze, copper alloy, stainless steel, gold, gold alloy and platinum. The conducting terminal 53 includes a first end 531 accommodated in the insulating tube 52, and a second end 532 opposite to the first end 531. The second end 532 of the conducting terminal 53 is exposed to an outside, for connecting to an external conducting contact point. The first end 531 of the conducting terminal 53 is less in length than the insulating tube 52. The first end 531 of the conducting terminal 53 is bent to form a longitudinal elongation with an opening facing upward. The longitudinal elongation may be either a semicircular elongation 61 (seeing FIG. 3) or a C-shaped elongation. Configuration of the second end 532 of the conducting terminal 53 may be one of: a disk-shaped portion with a central opening 711, 712 (Seeing FIGS. 4A, 4B), a disk-shaped portion having a central opening with serrations extending into the central opening 713 (Seeing FIG. 4C), an elongated plate portion 721 (Seeing FIG. 7D), an elongated plate portion with a bent distal end portion 722 (Seeing FIG. 4E), a plate portion with a Y-shaped front edge 731, 732, 733 (Seeing FIGS. 4F, 4G, 4H), a Y-shaped portion with at least one distal end bent portion 734 (Seeing FIG. 4I), a hook-shaped portion with an inclined opening 741 (Seeing FIG. 4J), an elongated round pin portion 751 (Seeing FIG. 4K) and an elongated oblate pin portion 752 (Seeing FIG. 4L).

The soldering sleeve 54 is arranged in the longitudinal elongation of the conducting terminal 53. The soldering sleeve 54 may include a slit configuration that is a characteristic formed during metal forming of the soldering sleeve 54. A material for making the soldering sleeve 54 can be selected from the group consisting of tin, plumbum, nickel, gold, silver, copper, bismuth and alloys of any of the above metals. One end of the soldering sleeve 54 extends out of the longitudinal elongation of the conducting terminal 53, and the extend-out section of soldering sleeve 54 includes a radially gradually enlarged portion 542 for facilitating the insertion of the conducting core 511 into the soldering sleeve 54. In the illustrated embodiment, the soldering sleeve 54 has a melting point at a third temperature that is between the first temperature and the second temperature. When a heat source is appropriately applied to an outer periphery 521 of the insulating tube 52 that corresponds to the soldering sleeve 54 to heat the insulating tube 52 to a temperature above the first temperature but below the third temperature, causing the heated insulating tube 52 to shrink to affix to an outer surface 541 of the soldering sleeve 54 and an end surface 543 outside an end point of the radially enlarged portion, an inner periphery of the insulating tube 52 forms a gradually converging configuration oriented toward the end point of the radially enlarged portion of the soldering sleeve 54. With this gradually converging configuration, the terminal connector with easy entry 5 is achieved such that the insulating tube 52 and the soldering sleeve 54 are tightly connected and the conducting core 511 is allowed to be readily inserted from one end of the soldering sleeve 54.

A method for manufacturing a terminal connector with easy entry 5 in accordance with a fourth preferred embodiment is further provided. The terminal connector with easy entry 5 is suitable for interconnecting a conducting terminal 53 and at least one conducting wire 51. Each said conducting wire 51 includes a conducting core 511 and an insulating cladding 512 enclosing the conducting core 511. The manufacturing method includes:

(1) providing an insulating tube 52, the insulating tube 52 shrinking to deform when being heated to a temperature higher than a first temperature and having a melting point at a second temperature;

(2) providing a conducting terminal 53, the conducting terminal 53 including a first end 531 and a second end 532 opposite to the first end 531, the second end 532 being exposed to an outside for connecting to an external conducting contact point, the first end 531 being bent to form a longitudinal elongation with an opening facing upward;

(3) arranging the longitudinal elongation of the first end 531 of the conducting terminal in the insulating tube;

(4) arranging a soldering sleeve 54 on the longitudinal elongation of the conducing terminal, the soldering sleeve 54 having a melting point at a third temperature that is between the first temperature and the second temperature, the soldering sleeve 54 having one end extending out of the longitudinal elongation of the conducting terminal 53, the extend-out section of the soldering sleeve including a radially gradually enlarged portion; and (5) appropriately applying a heat source to an outer periphery of the insulating tube that corresponds to the soldering sleeve 54 to heat the insulating tube 52 to a temperature above the first temperature but below the third temperature, causing the heated insulating tube 52 to affix to an end surface 543 outside an end point of the radially enlarged portion, such that an inner periphery of the insulating tube 52 forms a gradually converging configuration oriented toward the end point of the radially enlarged portion of the soldering sleeve 54, thereby achieving the terminal connector with easy entry 5 such that the insulating tube 52 and the soldering sleeve 54 are tightly connected and the conducting core 511 is allowed to be readily inserted.

In this embodiment, the terminal connector 5, insulating tube 52, conducting terminal 53, soldering sleeve 54, outer periphery 521 of the insulating tube, inner periphery 522 of the insulating tube, radially enlarged portion 542 and end point of the enlarged portion have the same characteristics as those described in the third embodiment.

It will be apparent to those skilled in the art that various modifications and variations can be made to the structure of the present invention without departing from the scope or spirit of the invention. It is intended that the present invention cover modifications and variations of this invention provided they fall within the scope of the following claims and their equivalents.

What is claimed is:

1. A terminal connector with easy entry configured for interconnecting a conducting terminal and at least one conducting wire, in which each said conducting wire comprises a conducting core and an insulating cladding enclosing the conducting core, and the terminal connector comprises: an insulating tube; a conducting terminal including a first end accommodated in the insulating tube, a second end opposite to the first end and being exposed to an outside for connecting to an external conducting contact point; and a soldering sleeve arranged on a longitudinal elongation of the conducing terminal; characterized in that the insulating tube shrinks to deform when being heated to a temperature higher than a first temperature and has a melting point at a second temperature;

the first end of the conducting terminal is bent to form the longitudinal elongation with an opening facing upward; and wherein the soldering sleeve has a melting point at a third temperature that is between the first temperature and the second temperature, the soldering sleeve includes an outer surface that is corrugated, one end of the soldering sleeve extends out of the longitudinal elongation of the conducting terminal, and the extend-out section of soldering sleeve includes a radially gradually enlarged portion;

wherein when a heat source is appropriately applied to an outer periphery of the insulating tube that corresponds to the soldering sleeve to heat the insulating tube to a temperature above the first temperature but below the third temperature, causing the heated insulating tube to shrink to lodge into gaps in the corrugated outer surface and affix to an end surface outside an end point of the radially enlarged portion, an inner periphery of the insulating tube forms a gradually converging configuration oriented toward the end point of the radially enlarged portion of the soldering sleeve, thereby achieving the terminal connector with easy entry such that the insulating tube and the soldering sleeve are tightly connected and the conducting core is allowed to be readily inserted.

2. The terminal connector with easy entry in accordance with claim 1, wherein the soldering sleeve comprises a slit configuration.

3. The terminal connector with easy entry in accordance with claim 2, wherein the soldering sleeve further comprises a corrugated inner surface.

4. The terminal connector with easy entry in accordance with claim 2, wherein the configuration of the second end is selected from the group consisting of: a disk-shaped portion with a central opening, a disk-shaped portion having a central opening with serrations extending into the central opening, an elongated plate portion, an elongated plate portion with a bent distal end portion, a plate portion with a Y-shaped front edge, a Y-shaped portion with at least one distal end bent portion, a hook-shaped portion with an inclined opening, an elongated round pin portion, and an elongated oblate pin portion.

5. A method for manufacturing a terminal connector with easy entry, in which the terminal connector with easy entry is configured to interconnect a conducting terminal and at least one conducting wire, wherein each said conducting wire includes a conducting core and an insulating cladding enclosing the conducting core, and the method is characterized in that providing an insulating tube, the insulating tube shrinking to deform when being heated to a temperature higher than a first temperature and having a melting point at a second temperature;

providing a conducting terminal, the conducting terminal including a first end and a second end opposite to the first end, the second end being exposed to an outside for connecting to an external conducting contact point, the first end being bent to form a longitudinal elongation with an opening facing upward;

arranging the longitudinal elongation of the first end of the conducting terminal in the insulating tube;

arranging a soldering sleeve on the longitudinal elongation of the conducing terminal, the soldering sleeve having a melting point at a third temperature that is between the first temperature and the second temperature, the soldering sleeve having an outer surface that is corrugated, one end of the soldering sleeve extending out of the longitudinal elongation of the conducting terminal, the extend-out section of the soldering sleeve including a radially gradually enlarged portion; and appropriately applying a heat source to an outer periphery of the insulating tube that corresponds to the soldering sleeve to heat the insulating tube to a temperature above the first temperature but below the third temperature, causing the heated insulating tube to shrink to lodge into gaps in the corrugated outer surface and affix to an end surface outside an end point of the radially enlarged portion, such that an inner periphery of the insulating tube forms a gradually converging configuration oriented toward the end point of the radially enlarged portion of the soldering sleeve, thereby achieving the terminal connector with easy entry such that the insulating tube and the soldering sleeve are tightly connected and the conducting core is allowed to be readily inserted.

6. The method for manufacturing the terminal connector with easy entry in accordance with claim 5, wherein the soldering sleeve comprises a slit configuration.

7. The method for manufacturing the terminal connector with easy entry in accordance with claim 6, wherein the soldering sleeve further comprises a corrugated inner surface.

8. The method for manufacturing the terminal connector with easy entry in accordance with claim 6, wherein the configuration of the second end is selected from the group consisting of: a disk-shaped portion with a central opening, a disk-shaped portion having a central opening with serrations extending into the central opening, an elongated plate portion, an elongated plate portion with a bent distal end portion, a plate portion with a Y-shaped front edge, a Y-shaped portion with at least one distal end bent portion, a hook-shaped portion with an inclined opening, an elongated round pin portion, and an elongated oblate pin portion.

9. A terminal connector with easy entry configured for interconnecting a conducting terminal and at least one conducting wire, in which each said conducting wire comprises a conducting core and an insulating cladding enclosing the conducting core, and the terminal connector comprises: an insulating tube; a conducting terminal including a first end accommodated in the insulating tube, a second end opposite to the first end and being exposed to an outside for connecting to an external conducting contact point; and a soldering sleeve arranged on a longitudinal elongation of the conducing terminal; characterized in that the insulating tube shrinks to deform when being heated to a temperature higher than a first temperature and has a melting point at a second temperature; and the first end of the conducting terminal is bent to form the longitudinal elongation with an opening facing upward;

wherein the soldering sleeve has a melting point at a third temperature that is between the first temperature and the second temperature, one end of the soldering sleeve extends out of the longitudinal elongation of the conducting terminal, and the extend-out section of soldering sleeve includes a radially gradually enlarged portion;

wherein when a heat source is appropriately applied to an outer periphery of the insulating tube that corresponds to the soldering sleeve to heat the insulating tube to a temperature above the first temperature but below the third temperature, causing the heated insulating tube to affix to an outer surface and an end surface outside an end point of the radially enlarged portion of the soldering sleeve, an inner periphery of the insulating tube forms a gradually converging configuration oriented toward the end point of the radially enlarged portion of the soldering sleeve, thereby achieving the terminal connector with easy entry such that the insulating tube and the soldering sleeve are tightly connected and the conducting core is allowed to be readily inserted.

10. The terminal connector with easy entry in accordance with claim 9, wherein the soldering sleeve comprises a slit configuration.

11. The terminal connector with easy entry in accordance with claim 10, wherein the configuration of the second end is selected from the group consisting of: a disk-shaped portion with a central opening, a disk-shaped portion having a central opening with serrations extending into the central opening, an elongated plate portion, an elongated plate portion with a bent distal end portion, a plate portion with a Y-shaped front edge, a Y-shaped portion with at least one distal end bent portion, a hook-shaped portion with an inclined opening, an elongated round pin portion, and an elongated oblate pin portion.

12. A method for manufacturing a terminal connector with easy entry, in which the terminal connector with easy entry is configured to interconnect a conducting terminal and at least one conducting wire, wherein each said conducting wire includes a conducting core and an insulating cladding enclosing the conducting core, and the method is characterized in that providing an insulating tube, the insulating tube shrinking to deform when being heated to a temperature higher than a first temperature and having a melting point at a second temperature;

providing a conducting terminal, the conducting terminal including a first end and a second end opposite to the first end, the second end being exposed to an outside for connecting to an external conducting contact point, the first end being bent to form a longitudinal elongation with an opening facing upward;

arranging the longitudinal elongation of the first end of the conducting terminal in the insulating tube;

arranging a soldering sleeve on the longitudinal elongation of the conducing terminal, the soldering sleeve having a melting point at a third temperature that is between the first temperature and the second temperature, one end of the soldering sleeve extending out of the longitudinal elongation of the conducting terminal, the extend-out section of the soldering sleeve including a radially enlarged portion; and appropriately applying a heat source to an outer periphery of the insulating tube that corresponds to the soldering sleeve to heat the insulating tube to a temperature above the first temperature but below the third temperature, causing the heated insulating tube to shrink to affix to an outer surface and an end surface outside an end point of the radially enlarged portion of the soldering sleeve, such that an inner periphery of the insulating tube forms a gradually converging configuration oriented toward the end point of the radially enlarged portion of the soldering sleeve, thereby achieving the terminal connector with easy entry such that the insulating tube and the soldering sleeve are tightly connected and the conducting core is allowed to be readily inserted.

13. The method for manufacturing the terminal connector with easy entry in accordance with claim 12, wherein the soldering sleeve comprises a slit configuration.

14. The method for manufacturing the terminal connector with easy entry in accordance with claim 12, wherein the configuration of the second end is selected from the group consisting of: a disk-shaped portion with a central opening, a disk-shaped portion having a central opening with serrations extending into the central opening, an elongated plate portion, an elongated plate portion with a bent distal end portion, a plate portion with a Y-shaped front edge, a Y-shaped portion with at least one distal end bent portion, a hook-shaped portion with an inclined opening, an elongated round pin portion, and an elongated oblate pin portion.

* * * * *